(12) United States Patent
Kim

(10) Patent No.: US 9,094,369 B2
(45) Date of Patent: Jul. 28, 2015

(54) METHOD AND APPARATUS FOR STORING AND RESTORING STATE INFORMATION OF REMOTE USER INTERFACE

(75) Inventor: Yoon-soo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1423 days.

(21) Appl. No.: 11/652,489

(22) Filed: Jan. 12, 2007

(65) Prior Publication Data
US 2007/0174300 A1    Jul. 26, 2007

Related U.S. Application Data

(60) Provisional application No. 60/758,219, filed on Jan. 12, 2006.

(30) Foreign Application Priority Data

May 11, 2006    (KR) ......................... 10-2006-0042617

(51) Int. Cl.
| | |
|---|---|
| H04L 29/08 | (2006.01) |
| G06F 9/54 | (2006.01) |
| G06F 17/30 | (2006.01) |
| H04L 12/28 | (2006.01) |

(52) U.S. Cl.
CPC .............. *H04L 67/025* (2013.01); *G06F 9/542* (2013.01); *G06F 17/30899* (2013.01); *H04L 67/02* (2013.01); *H04L 67/142* (2013.01); *G06F 2209/544* (2013.01); *G06F 2209/545* (2013.01); *H04L 12/282* (2013.01); *H04L 12/2803* (2013.01); *H04L 12/2818* (2013.01)

(58) Field of Classification Search
USPC .................................................. 709/203, 228
See application file for complete search history.

(56) References Cited

U.S. PATENT DOCUMENTS

| | | | | |
|---|---|---|---|---|
| 6,324,564 B1 * | 11/2001 | Thielke et al. | ................ | 709/202 |
| 6,711,618 B1 * | 3/2004 | Danner et al. | ................ | 709/228 |
| 6,763,371 B1 * | 7/2004 | Jandel | ........................... | 709/204 |

(Continued)

FOREIGN PATENT DOCUMENTS

| | | |
|---|---|---|
| EP | 0877322 A3 | 2/2004 |
| JP | 2000-020472 A | 1/2000 |

(Continued)

OTHER PUBLICATIONS

European Search Report, Application No. 07100066.5-2413, dated Jun. 1, 2007.

(Continued)

*Primary Examiner* — Backhean Tiv
(74) *Attorney, Agent, or Firm* — Sughrue Mion, PLLC

(57) ABSTRACT

Provided are an apparatus and method of restoring a remote user interface (RUI) in a Universal Plug and Play (UPnP) environment. In the apparatus and method, an RUI client requests an external storage server to store the state information of the RUI by using a Hypertext Transfer Protocol (HTTP) object processing a HTTP request without reloading a web page, and restores the original state of the RUI by using the stored state information. Accordingly, it is possible to apply a method of storing and restoring state information of a remote user interface, in a UPnP environment, to a HTTP-based remote protocol model having stateless characteristics which do not allow state information of a remote user interface to be stored.

25 Claims, 20 Drawing Sheets

(56) References Cited

U.S. PATENT DOCUMENTS

| | | | |
|---|---|---|---|
| 6,820,111 B1* | 11/2004 | Rubin et al. | 709/203 |
| 7,194,689 B2* | 3/2007 | Manni et al. | 715/735 |
| 7,376,723 B2* | 5/2008 | Cho et al. | 709/223 |
| 7,440,997 B2* | 10/2008 | Colling et al. | 709/203 |
| 7,562,131 B2* | 7/2009 | Dutta et al. | 709/223 |
| 7,844,442 B2* | 11/2010 | Tzruya | 703/22 |
| 7,958,272 B2* | 6/2011 | Ko et al. | 709/250 |
| 8,219,692 B2* | 7/2012 | Kim et al. | 709/228 |
| 2003/0229900 A1* | 12/2003 | Reisman | 725/87 |
| 2005/0022210 A1 | 1/2005 | Zintel et al. | |
| 2005/0066037 A1* | 3/2005 | Song et al. | 709/227 |
| 2005/0171950 A1 | 8/2005 | Dumitru et al. | |
| 2005/0210155 A1* | 9/2005 | Oeda et al. | 709/249 |
| 2005/0283619 A1* | 12/2005 | Min | 713/182 |
| 2006/0080382 A1* | 4/2006 | Dutta et al. | 709/203 |
| 2006/0168526 A1* | 7/2006 | Stirbu | 715/740 |
| 2006/0179118 A1* | 8/2006 | Stirbu | 709/217 |
| 2006/0200570 A1* | 9/2006 | Stirbu et al. | 709/230 |
| 2006/0259982 A1* | 11/2006 | Upendran | 726/27 |
| 2006/0279774 A1* | 12/2006 | Matsuoka et al. | 358/1.15 |
| 2007/0005783 A1* | 1/2007 | Saint-Hillaire et al. | 709/230 |
| 2007/0067305 A1* | 3/2007 | Ives | 707/10 |
| 2007/0174300 A1* | 7/2007 | Kim | 707/10 |
| 2007/0174301 A1* | 7/2007 | Kim et al. | 707/10 |
| 2009/0024717 A1* | 1/2009 | Im | 709/218 |

FOREIGN PATENT DOCUMENTS

| | | | |
|---|---|---|---|
| JP | 2004-501428 A | 1/2004 | |
| JP | 2004062873 A | 2/2004 | |
| KR | 1020040026389 A | 3/2004 | |
| WO | WO 2004/088543 A1 * | 10/2004 | G06F 17/30 |

OTHER PUBLICATIONS

Walter Dees, Paul Shrubsole, "WEB4CE: Accessing Web-Based Applications on Consumer Devices", XP-002431655, WWW 2007/ Posted Paper, pp. 1303-1304.

ANSI/CEA Standard, Web-Based Protocol and Framework for Remote User Interface on UPnP™ Networks and the Internet (WEB4CE), XP-002431656, ANSI/CEA-2014, Dec. 2006, pp. i-iii and 1.

European Search Report issued on Oct. 19, 2010 in counterpart European Application No. 10173160.2.

Communication, dated Jun. 5, 2012, issued by the State Intellectual Property Office of P.R. China in corresponding Chinese Application No. 200710000356.5.

Communication, dated Mar. 21, 2012, issued by the Japanese Patent Office in corresponding Japanese Application No. 2007-003885.

Chinese Office Action issued Aug. 31, 2011 in corresponding Chinese Application No. 200710000356.5.

Communication dated Nov. 14, 2007 issued by the Korean Intellectual Property Office in counterpart Korean Application No. 10-2006-0042617.

Communication dated Nov. 8, 2011 issued by the Japanese Patent Office in counterpart Japanese Patent Application No. 2007-003885.

* cited by examiner

FIG. 5

- Instantiation:
  var ssh = new StatesStorage();
- Properties:
  - Array urls : read-only. When read, returns array for URLs for SSS with save feature. The returned URLs for SAVE command SHALL be of format of http://SSS-IP-ADDR:PORT /SAVE. JavaScript SHALL add additional argument, say, ?_name_=NameForThePageToBeSaved
  - Array names: read-only. When read, returns array for values of <friendlyName> in RUIS device description for RUIS' with save feature. Each element in urls and names SHALL have same subscript for same RUIS Methods:
  - none

FIG. 6

- Constructor
  - New NotifSocket() – Creates a new instance of the NotifSocket object. In addition to creation of NotifSocket for event notification, NotifSocket can be created for "HTTP Message
- Properties
  - Readonly Number tcpStatus – read-only property that indicates the status of the underlying TCP
    - 0 = disconnected
    - 1 = connec t to RUIS with TCP
    - 2 = Success to send data to RUIS
    - 3 = Fail to send data to RUIS
  - Function(Event Handler) onConnectionStatusChange – read-write property that specifies the function that SHALL be called when the tcpStatus changes to 0 (disconnect).
    - If the tcpStatus changes to 0, the UI Client may handle a connection-error with reloading the RUIS page or indicating an connection-error
  - Function(Event Handler) onDataArrival – read-write property that specifies the function that SHALL be called when a message has been received through the TCP connection.
    - If it includes a message starting with HTTP start line such as "HTTP/1.1 200 OK?". this is the "HTTP response." Otherwise, it includes a message containing the event notification of RUIS
  - Function(Event Handler) onSendError – read-write property that the specifies the function that SHALL be called when the tcpStatus change to 4(Fail to send data to RUIS).
    - The UI Client may resend the message from the buffer of NotifSocket
- Methods
  - openPersistentConnection(String ipAddr, Number portNr) – Instructs the UI client to create a TCP/IP connection to the given server IP address and port at the server that served the script that calls this method. If the 1st argument is "", the IP address of interacting RUIS is assumed.
  - getD ata: String – Returns the message (up to the next EOF character) that was received via the TCP/IP connection that has been opened through method openPersistentConnection(), and for which the onDataArrival-handler was called. Note that the UI client is responsible
  - for buffering incoming events to prevent incoming events from getting lost. sendData(String Data) – To send the given data (concatenated with an EOF character) over the TCP/IP connection that has been opened through method openPersistentConnection() to the server. This method should not block the execution of subsequent methods. The UI client is responsible for buffering the events and try to prevent events from getting lost with tcpStatus and onSendError

FIG. 8A

```
<HTML>
<HEAD>
<TITLE>RUI DEMO</TITLE>
<meta http-equiv="Content-Type" content="text/html; charset=euc-kr">
</HEAD>
<script language='JavaScript'>
var serverStates = "";
var xpos = 0;
var ypos = 0;
function getserverstate()
{
   ## may be instantiated using var ns = NotifSocket();
   ## opens TCP Connection Socket or XMLHttpRequest to RUIS and sends
   GETSTATES command to RUIS ns.openPersistentConnection("", 8080);
   data = "GET /GETSTATES HTTP/1.0\r\n" +
"HOST: ipaddress:port \r\n" + "User-Agent: ...\r\n" + Other HTTP headers + " \r\n" +
   ns.sendData(data);
   ns.onDataArrival = setserverstate;
   return;
}
function setserverstate()
{
   data = ns.getData();
   ## extract the body text into 'serverstate' variable
   startSelectingSSS();
   return;
}
function save(url)
{
   xpos = document.menu.style.pixelLeft;
   ypos = document.menu.style.pixelTop;
   ## parse the url and extract IP(sip) and port number(sport)
   ## Recreate the connection  ns.openPersistentConnection(sip, sport);
   ## compose SAVE command to sends it to the selected RUIS using NotifSocket
   req = "POST /SAVE?__name__=" + name_string + "HTTP/1.0\r\n";body = "__url__="
   + http://10.10.10.10/EPG" + "&__serverStates__=" + serverstate + any UI states followed
   + "\r\n"; headers = "Content-Length: " + length of body + "\r\n";
   + other headers followed + "\r\n";
   ns.sendData (req + headers + body);
   ns.onDataArrival = checkSaveResult;
}
```

FIG. 8B

```
function startSelectingSSS()
{
    srh = new StatesStorage();
    Array urls = document.srh.urls;
    Array names = document.srh.names;
    nw = window.open("", "_blank", "toolbar=no, location=no, directories=no, status=no,
    menubar=no, scrollbars=no, resizable=no, copyhistory=no, width=400, height=400");
    nw.document.open("text/html", "replace");
    var doc = <html><head><title>Selects a SSS</title></head>";
    doc += "<a href='javascript:opener.save(\"URL1\")' onClick='opener.save(\"URL1\");
    self.close();'>1st SSS</a><br/>" + "<a href='javascript:opener.save(\"URL2\")'
    onClick='opener.save(\"URL2\"); self.close();'>2nd SSS</a><br/>";
    doc += "</body></html>";
    doc += </body></html>":
    nw.document.write(doc);
    nw.document.close();
}
function checkSaveResult()
{
    data = ns.getData();
    ## check whether    the response is a normal response
}
</script>
<BODY>
<table align=center>
    <tr>
        <td><input name="save" type="button" value="save"
            onclick="javascript:getserverstate()>
    </tr>
</table>
<img src="editbx.gif" border="0" name="menu" class="drag" width=402 height=43>
</HTML>
```

FIG. 9A

```
<HTML>
……

<script language='JavaScript'>
function getserverstate()
{
   ## may be instantiated using var ns = NotifSocket();
   ## opens TCP Connection Socket or XMLHttpRequest to RUIS and sends
   GETSTATES command to RUIS
   ns.openPersistentConnection(8080);
   data = "GET /GETSTATES HTTP/1.0\r\n" +
  "HOST: ipaddress\r\n" +
  "User-Agent: ...\r\n" +
Other HTTP headers +\r\n" + "\r\n";
   ns.sendData(data);
   ns.onDataArrival = setserverstate;
   return;
}
function setserverstate()
{
   data = ns.getData();
   ## extract the body text into 'serverstate' variable
   startSelectingSSS();
   return;
}
function startSelectingSSS()
{
   window.open("URL_For_SSS_Selector", "_blank",
     "toolbar=no, location=no, directories=no, status=no, menubar=no,
     scrollbars=no, resizable=no, copyhistory=no, width=400, height=400"
   return;
}
```

FIG. 9B

```
function save(url)
{
    xpos = document.menu.style.pixelLeft;
    ypos = document.menu.style.pixelTop;
    ## parse the url and extract IP(sip) and port number(sport)
    ## Recreate the connection
    ns.openPersistentConnection(sip, sport);
    ## compose SAVE command to sends it to the selected RUIS using NotifSocket
    req = "POST /SAVE?__name__=" + name_string + "HTTP/1.0 \r \n";
    body = "__url__=" + myurl + "&__serverStates__=" + serverstate + any UI states followed +
    "\r \n"; headers = "Content-Length:" + length of body + "\r \n"+ other headers followed +
    "\r \n";
    ns.sendData(req + headers + body);
    ns.onDataArrival = checkSaveResult;
}
function checkSaveResult()
{
    data = ns.getData();
    ## check whether the response is a normal response
}
</script>
<BODY>
<table align=center>
    <tr>
        <td><input name="save" type="button" value="save"
            onclick="javascript:getserverstate()"></td>
    </tr>
</table>
<img src="editbx.gif" border="0" name="menu" class="drag" width=402 height=43>
</HTML>
```

FIG. 17

```
<HTML>
<HEAD>
<TITLE>RUI DEMO</TITLE>
<meta http-equiv="Content-Type" content="text/html; charset=euc-kr">
</HEAD>
<script language='JavaScript'>

Here will be script related to saving states function startRestoringUIStates( URLForSavedStates )
{
   ## opens  TCP Connection to SSS
   var ns = new NotifSocket()   ;
   ## Parse the URLForSavedStates and extract SSS ip(sip)
   and SSS port(sport) and path component(spath)
   ns.openPersistentConnection(sip, sport);
   req = "GET" + path + " HTTP/1.0\r\n";
   ## Adding headers(headers variable)
   ns.sendData(req + headers);
   ns.onDataArriaval = restoreUIStates()
}
function restoreUIStates()
{
    data = ns.getData();
   ## parse the data and extract UI states into variables(xpos, ypos)
   document.menu.style.pixelLeft = xpos;
   document.menu.style.pixelTop = ypos;
    ns.close();
}
<BODY onLoad="javascript:startRestoringUIStates(URLForSavedStates);">
<table align=center>
   <tr>
       <td><input name="save" type="button" value="save"
           onclick="javascript:getserverstate()"></td>
   </tr>
</table>
<img src="editbx.gif" border="0" name="menu"
        class="drag" width=402 height=43>
</HTML>
```

METHOD AND APPARATUS FOR STORING AND RESTORING STATE INFORMATION OF REMOTE USER INTERFACE

CROSS-REFERENCE TO RELATED PATENT APPLICATION

This application claims the benefits of U.S. Provisional Patent Application No. 60/758,219, filed on Jan. 12, 2006 in the USPTO, and Korean Patent Application No. 10-2006-0042617, filed on May 11, 2006 in the Korean Intellectual Property Office, the disclosures of which are incorporated herein in their entirety by reference.

BACKGROUND OF THE INVENTION

1. Field of the Invention

Apparatuses and methods consistent with the present invention relate to restoring state information of a remote user interface (RUI), and more particularly, to restoring an RUI in a Universal Plug and Play (UPnP) environment.

2. Description of the Related Art

FIG. 1 is a block diagram of a conventional Universal Plug and Play (UPnP)-based remote user interface (RUI) network system ("the system"). Referring to FIG. 1, the system includes an RUI control point (CP) 11, an RUI client 12, and an RUI server 13. Here, the RUI Control Point (CP) 11 corresponds to a UPnP CP supporting a remote user interface, and the RUI client 12 and the RUI server 13 correspond to a UPnP controlled device (CD) supporting the remote user interface.

According to UPnP, the RUI CP 11 discovers and controls the RUI client 12 and the RUI server 13. The RUI client 12 and the RUI server 13 that are connected under the control of the RUI CP 11, process a request and response received via an RUI according to out-of-band remote protocol, such as remote desktop protocol (RDP) and extended remote technology (XRT) protocol.

FIG. 2 is a diagram illustrating a conventional process of storing and restoring state information of an RUI according to UPnP. In particular, the process of FIG. 2 is related to a case where a connection of a first RUI client 22 to an RUI server 24 is changed to a connection of a second RUI client 23 to the RUI server 24.

In operation 201, the RUI CP 21 searches for RUI connections that are currently in progress by calling GetCurrentConnection( ) to the first RUI client 22, and learns a connection to the RUI server 24 from the searched RUI connections.

In operation 202, the RUI CP 21 calls SetUILifetime( ) to the RUI server 24 in order to instruct the RUI server 24 to maintain the RUI connections that are currently in progress, for a predetermined time.

In operation 203, the RUI CP 21 calls Disconnect( ) to the first RUI client 22 in order to terminate the RUI connections that are in progress.

In operation 204, the RUI CP 21 calls Connect( ) to the second RUI client 23 in order to start the RUI connections maintained according to the instructions given in operation 202.

However, as described above, the conventional method of FIG. 2 is applicable only to a remote protocol model which allows all state information of URIs to be stored in an RUI server. However, in the case of a HyperText Transfer Protocol (HTTP)-based remote protocol model, when a transaction that processes a request and a response is completed, the state information of a remote interface is lost and is not stored due to the stateless characteristics of the HTTP, and therefore, the RUI client manages most of the state information.

Accordingly, the conventional process of storing and restoring state information of an RUI according to UPnP is applicable to remote protocol models, such as RDP and XRT, in which all state information of RUIs is stored in an RUI server. However, the conventional process has a problem in that it cannot be applied to remote protocol models, such as HTTP, in which most of the state information is managed by an RUI client. In particular, binary protocol-based RDP and XRT need a wider network bandwidth than HTTP. Therefore, since a HTTP-based RUI is widely used, the above problems exist.

SUMMARY OF THE INVENTION

The present invention provides a method and apparatus for allowing a process of storing and restoring state information of a remote user interface (RUI) in a Universal Plug and Play (UPnP) environment, to be applied to a HyperText Transfer Protocol (HTTP)-based remote protocol model, having stateless characteristics, that does not allow state information of an RUI to be stored.

The present invention also provides a computer readable recording medium having recorded thereon a program for executing the method.

According to an aspect of the present invention, there is provided a method of allowing a client, which receives the remote user interface from a server, to request state information of a remote user interface to be saved, the method comprising obtaining the state information of the remote user interface, which is generated when the remote user interface is used, by using an object which processes a predetermined request without reloading the remote user interface; and requesting that the obtained state information be stored.

According to another aspect of the present invention, there is provided a computer readable medium having recorded thereon a program for executing the method of requesting that state information regarding a remote user interface be stored.

According to another aspect of the present invention, there is provided an apparatus for allowing a client, which uses the remote user interface provided from a server, to request storage of state information of a remote user interface, the apparatus comprising a remote user interface control point module obtaining information regarding a storage server which provides storage for storing the state information; and a web browser module requesting the storage server to store the state information by using an object processing a predetermined request without reloading the remote user interface, based on the information regarding the storage server obtained by the remote user interface control point module.

According to another aspect of the present invention, there is provided a method of allowing a client, which receives the remote user interface from a server, to restore state information of a remote user interface, the method comprising obtaining state information, which is generated when the remote user interface is used, by using an object processing a predetermined request without reloading the remote user interface; and reflecting the obtained state information in the remote user interface.

According to another aspect of the present invention, there is provided a computer readable medium having recorded thereon a program for executing the method of restoring state information regarding a remote user interface.

According to another aspect of the present invention, there is provided an apparatus for allowing to a client, which receives the remote user interface from a server, to restore state information of a remote user interface, the apparatus comprising a remote user interface control point module obtaining information regarding a storage server providing storage for storing the state information; and a web browser module obtaining the state information from the storage server by using an object processing a predetermined request without reloading the remote user interface, based on the information regarding the storage server obtained by the remote user interface control point module; and reflecting the obtained state information in the remote user interface.

BRIEF DESCRIPTION OF THE DRAWINGS

The above and other aspects of the present invention will become more apparent by describing in detail exemplary embodiments thereof with reference to the attached drawings in which:

FIG. 5 illustrates syntax representing an interface of a State Storage (SS) handler according to an exemplary embodiment of the present invention;

FIG. 6 illustrates syntax representing an interface of a Transmission Control Protocol (TCP) connection object according to an exemplary embodiment of the present invention;

FIGS. 8A and 8B illustrate syntax representing a savable page according to an exemplary embodiment of the present invention;

FIGS. 9A and 9B illustrate syntax representing another exemplary embodiment of the savable page represented by the syntax shown in FIGS. 8A and 8B according to the present invention;

FIG. 17 illustrates syntax representing a savable page corresponding to a restoring response document according to an exemplary embodiment of the present invention;

DETAILED DESCRIPTION OF THE INVENTION

Hereinafter, exemplary embodiments of the present invention will be described in detail with reference to the accompanying drawings. In this disclosure, a remote user interface (RUI) based on a HyperText Transfer Protocol (HTTP) which is a stateless protocol that does not store state information, will be described with respect to a web page containing a HTTP object which is a Java script object that processes a HTTP request without reloading the web page. However, it would be apparent to those of ordinary skill in the technical field to which the present invention pertains that the exemplary embodiments of the present invention are applicable to other types of remote user interfaces, and not just the web page.

Figure 1:
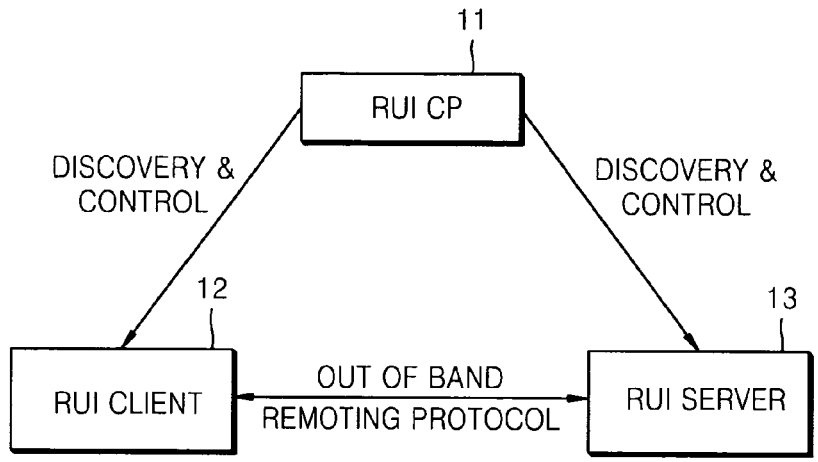
FIG. 1 is a block diagram of a conventional Universal Plug and Play (UPnP)-based remote user interface (RUI) network system.
Figure 2:
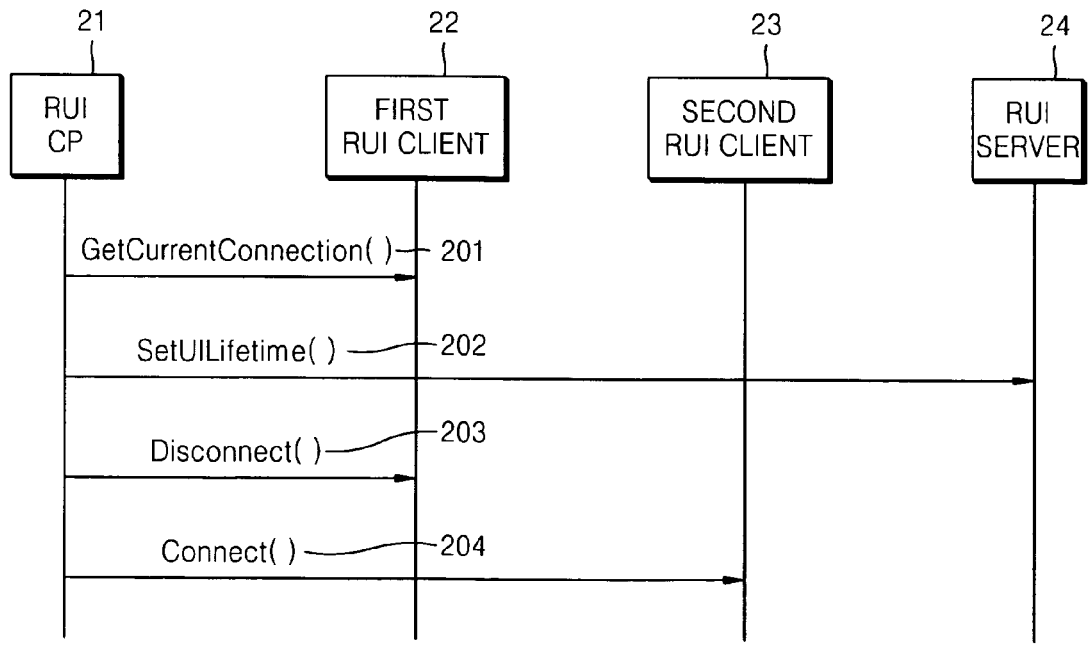
FIG. 2 is a diagram illustrating a conventional process of storing and restoring state information of an RUI according to UPnP.
Figure 3:
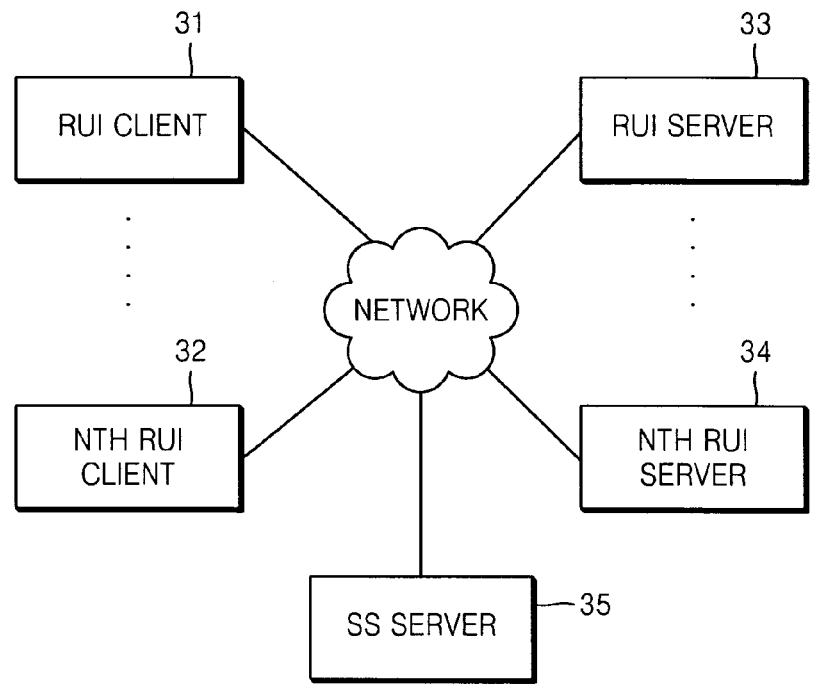
FIG. 3 is a block diagram of a UPnP-based RUI network system according to an exemplary embodiment of the present invention.

FIG. 3 is a block diagram of a Universal Plug and Play (UPnP)-based RUI network system ("the system") according to an exemplary embodiment of the present invention. Referring to FIG. 3, the system includes RUI client 31 and an Nth RUI client 32, RUI servers 33 and 34, and a State Storage (SS) server 35. In particular, the SS server 35 is a server that provides a state storage for storing the state information of a web page corresponding to an RUI. Also, the RUI client 31 and an Nth RUI client 32 and the RUI servers 33 and 34 are 2-box models, each having a built-in RUI control point (CP) module and acquiring information regarding the SS server 35 during UPnP discovery. However, the RUI clients 31 and 32 and the RUI servers 33 and 34 do not need to have the built-in RUI CP module, and can receive the information regarding the SS server 35 from another node in this case.

Figure 4:
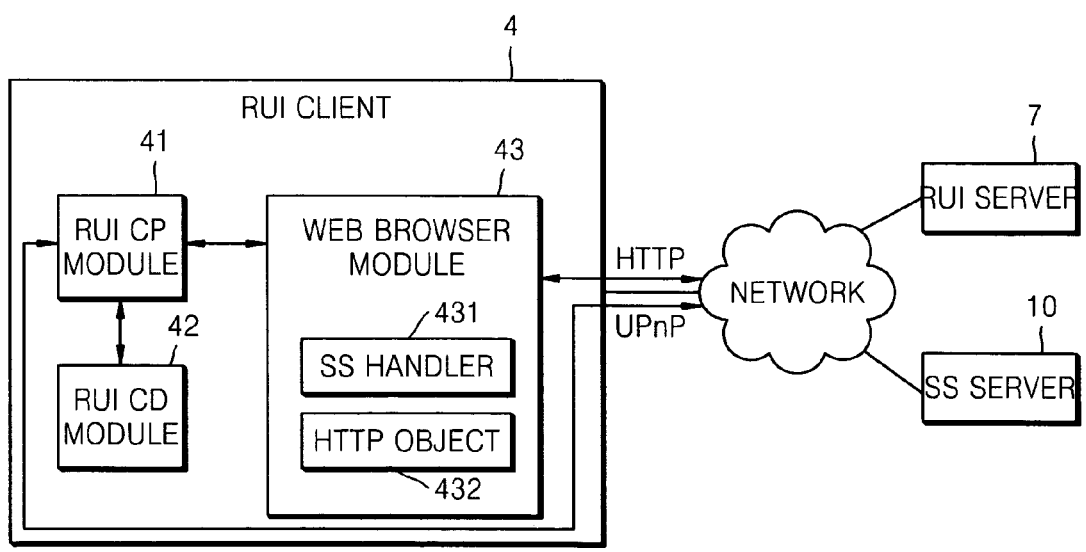
FIG. 4 is a block diagram of an RUI client according to an exemplary embodiment of the present invention.

FIG. 4 is a block diagram of an RUI client 4 according to an exemplary embodiment of the present invention. Referring to FIG. 4, the RUI client 4 includes an RUI CP module 41, an RUI controlled device (CD) module 42, and a web browser module 43. In particular, the RUI CP module 41 and the RUI CD module 42 are optional modules needed when the RUI client 4 is located in an autonomous network, such as a home network, to which UPnP is applicable. Also, the RUI CP module 41 may be located outside the RUI client 4, instead of inside thereof.

The RUI CP module 41 acts as a UPnP CP that discovers and controls UPnP CDs. In particular, according to an exemplary embodiment of the present invention, the RUI CP module 41 acquires information regarding an SS server 10, based on UPnP, during discovery of an RUI server 7 and an SS server 10 which are CDs based on UPnP. Also, the RUI CP module 41 provides the information regarding the SS server 10 to an SS handler 431 in order to request that state information of a remote interface, i.e., a web page, be stored.

The RUI client 4 may include "<hasControlPoint>true</hasControlPoint>", indicating that it has the RUI CP module 41, in a HTTP header.

The RUI CD module 42 advertises that it is a UPnP CD, and acts as a UPnP CD to be controlled by a UPnP CP that discovers the RUI CD module 42 in response to the advertisement.

The web browser module 43 acts as a HTTP-based general web browser. That is, the web browser module 43 is a client module that receives a request for the web page corresponding to the remote user interface from a user, transmits the request to the RUI server 7 having a web server, and renders the web page acquired in response to the request, so as to display the rendering result.

In particular, the web browser module 43 may include the SS handler 431 therein or in the form of a plug-in. The SS handler 431 is an optional module needed only when the RUI CP module 41 is present. The RUI CP module 41 and the SS handler 431 are capable of establishing internal communications via interprocess communication (IPC) or a UNIX domain socket. When receiving the HTTP header and realizing that the RUI client 4 includes the RUI CP module 41, the RUI server 7 may provide a savable page, represented by the syntax shown in FIGS. 8A and 8B, which contains a Java script using the SS handler 431 to obtain the information regarding the SS server 10. That is, when the Java script is executed, the SS handler 431 obtains the information regarding the SS server 10 from the RUI CP module 41 and provides the savable page with the obtained information.

FIG. 5 illustrates syntax representing an interface of the SS handler 431 illustrated in FIG. 4 according to an exemplary embodiment of the present invention. Referring to FIG. 5, the interface of the SS handler 431 provides properties representing uniform resource locators (URLs) (array URLs) of SS servers providing a state storage that stores state information of a web page corresponding to an RUI, and the names of the SS servers (array names).

Also, the web browser module 43 includes the HTTP object 432 in the form of a native object or plug-in. The HTTP object 432 is a Java script object that processes a request for HTTP without reloading the web page. The HTTP object 432 may be an XMLHttpRequest or a Transmission Control Protocol (TCP) connection object.

FIG. 6 illustrates syntax representing an interface of a TCP connection object according to an exemplary embodiment of the present invention. Referring to FIG. 6, the interface of the TCP connection object provides a callback regarding an event notifying a change in the state of a TCP connection, a callback regarding an event notifying the arrival of data, a callback regarding an event notifying that a data transfer error occurs, a method of opening a TCP/IP connection, a method of acquiring the data, a method of transmitting the data, etc.

The web browser module 43 receives the savable page represented by the syntax shown in FIGS. 8A and 8B from the RUI server 7. Also, when receiving from the user a command to save state information regarding an RUI, that is, when the user clicks a "SAVE" button on the savable page, the web browser module 43 requests the state information regarding the RUI server 7, which is generated when the user uses the web page, in the case where a Java script included in the web page is executed to generate the state information of the RUI server 7. That is, the web browser module 43 transmits a GETSTATES request message illustrated in FIG. 11 to the RUI server 7.

Also, the web browser module 43 acquires the state information of the RUI server 7 in response to the request. That is, the web browser module 43 receives from the RUI server 7 a GETSTATES response message illustrated in FIG. 12 in response to the GETSTATES request message, and obtains the state information of the RUI server 7 by executing the Java script included in the web page. If the user uses a web page regarding product sales, information regarding a product that the user selects remains in the RUI server 7. Also, if the user uses a web page regarding user authentication, information regarding a result of user authentication remains in the RUI server 7. Such items of information are examples of the state information of the RUI server 7.

Also, the web browser module 43 executes the Java script included in the web page to read the state information of the RUI client 4, which is generated when the user uses the web page, from the web page. While the user is using the web page, form input information, cookie information, and state information of an audio/visual (AV) object corresponding to an input value from the user are generated. Such items of information are examples of the state information of the RUI client 4.

In order to request the SS server 10 to save the above generated information and the obtained state information of the web page, that is, the state information of the RUI client 4 and the RUI server 7, the web browser module 43 receives information regarding the SS server 10 from the RUI CP module 41 or an RUI CP module 71 of the RUI server 7. More specifically, the web browser module 43 may execute the Java script included in the web page in order to display the information of the SS server 10 to the user so that the user can select the SS server 10 as a storage server for storing the state information of the web page. Otherwise, the web browser module 43 may request the SS handler 431 to provide the information of the SS server 10, and display the obtained information to the user so that the user can select the SS server 10 as a storage server for storing the state information of the web page.

Also, the web browser module 43 executes the Java script in the web page in order to request the SS server 10 to save the state information of the web page by using the information of the SS server 10 selected by the user, i.e., a URL of the SS server 10. That is, the web browser module 43 transmits a SAVE request message illustrated in FIG. 20 to the SS server 10.

Also, when receiving from the user a command to display a list of web pages that can be restored according to the user's selection, i.e., a list of restoring pages, the web browser module 43 receives the information of the SS server 10 from the RUI CP module 41 or the RUI CP module 71 of the RUI server 7. Also, the web browser module 43 requests the SS server 10 to provide the list of restoring pages by using the information of the SS server 10, i.e., the URL of the SS server 10. That is, the web browser module 43 transmits a restoring page request message illustrated in FIG. 14 to the SS server 10.

Also, the web browser module 43 obtains the list of restoring pages from a response to the request. That is, the web browser module 43 receives from the SS server 10 a restoring page response message, illustrated in FIG. 15, in response to the restoring page request message, and obtains from the restoring page response message the URLs of web pages corresponding to the list of restoring pages (RUIs), the state information of the RUI server 7, and the URL which is location information of a site that stores the state information of the RUI client 4. Also, the web browser module 43 displays the list of restoring pages to the user, and receives a selection from the user who views the displayed list of restoring pages. That is, the web browser module 43 is given the URL of a web page that the user desires to restore.

Also, the web browser module 43 requests the RUI server 7 to restore the web page selected by the user. That is, the web browser module 43 requests the RUI server 7 to start execution of an RUI application by providing the RUI server 7 with a restoring request message, illustrated in FIG. 16, which contains the state information of the RUI server 7 and the URL which is the location information of the site storing the state information of the RUI client 4.

Figure 16:
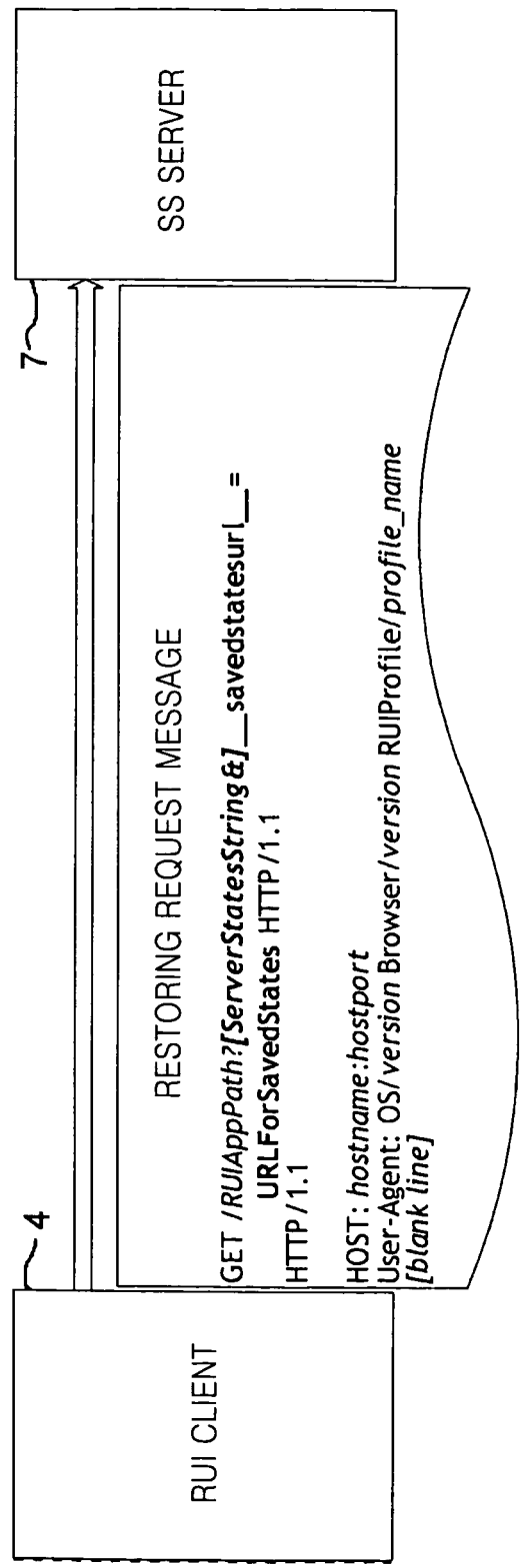
FIG. 16 illustrates the format of a restoring request message according to an exemplary embodiment of the present invention.

Also, the web browser module 43 transmits the restoring request message illustrated in FIG. 16 to the RUI server 7, and receives as a response to the restoring request message a savable page, represented by the syntax shown in FIG. 17, which contains a Java script allowing the state information of the RUI client 4 to be received using the URL which is the location information of the site storing the state information of the RUI client 4.

Also, the web browser module 43 executes the Java script in the savable page represented by the syntax shown in FIG. 17 in order to obtain from the SS server 10 the state information of the RUI client 4, which is needed to recover the selected web page by using the URL which is the location information of the site storing the state information of the RUI client 4. Also, the web browser module 43 executes the Java script in the savable page to reflect the state information of the RUI client 4 into the savable page, thereby restoring the state of the RUI client 4 in the web page.

Figure 7:
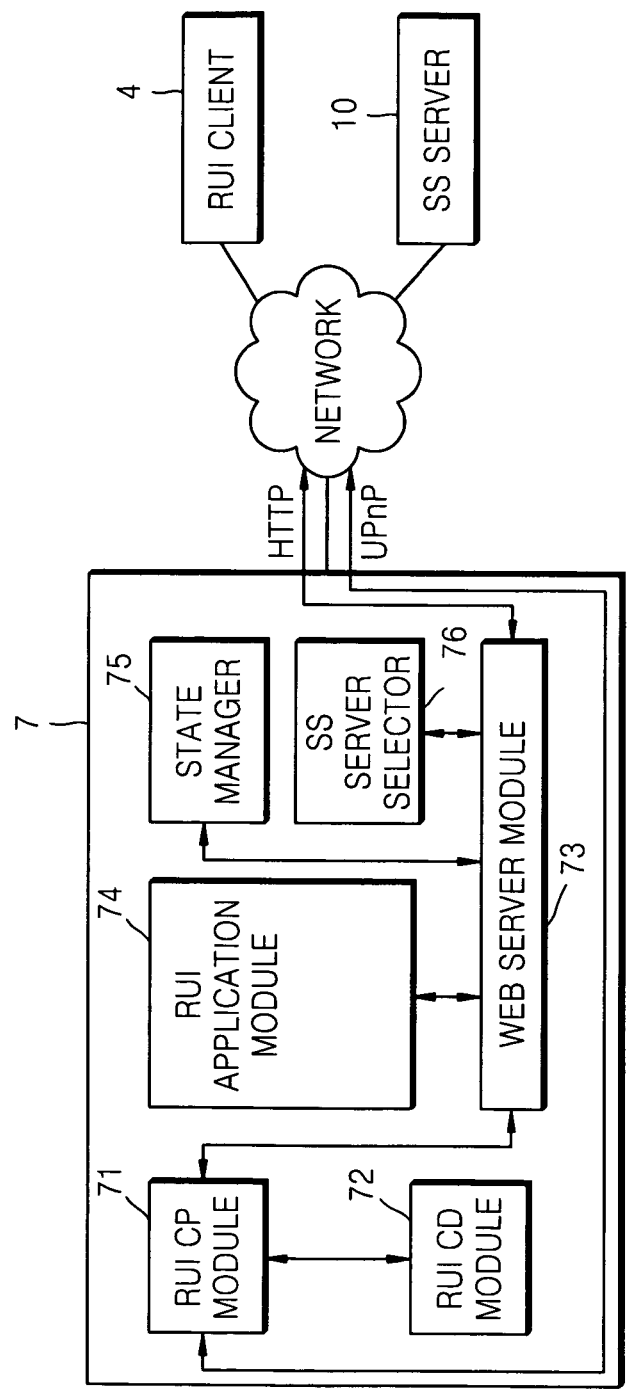
FIG. 7 is a block diagram of an RUI server according to an exemplary embodiment of the present invention.

FIG. 7 is a block diagram of the RUI server 7 of FIG. 4 according to an exemplary embodiment of the present invention. Referring to FIG. 7, the RUI server 7 includes an RUI CP module 71, an RUI CD module 72, a web server module 73, an RUI application module 74, a state manager 75, and an SS server selector 76. In particular, the RUI CP module 71 and the RUI CD module 72 are optional modules needed when the RUI server 7 is located in an autonomous network, such as a home network to which UPnP is applicable. Also, the RUI CP module 71 may be located outside the RUI server 7, instead of inside thereof.

The RUI CP module 71 acts as a UPnP CP that discovers and controls UPnP CDs. In particular, according to an exemplary embodiment of the present embodiment, when the RUI client 4 does not include the RUI CP module 41, the RUI CP module 71 obtains information of the SS server 10 during discovery of the SS server 10 according to UPnP and provides it to the SS server selector 76.

The RUI CD module 72 advertises that it is a UPnP CD, and acts as a UPnP CD controlled by a UPnP CP that discovers the RUI CD module 72 according to the advertisement.

The web server module 73 acts as a HTTP-based general web server. That is, the web server module 73 is a HTTP server module that receives a request for an application from the RUI client 4, processes the application, and provides the result of processing, in response to the request. In particular, when receiving a request for a general web page from the RUI client 4, the web server module 73 creates and provides a web page in response to the request.

The state manager 75, which manages the state information of the RUI server 7, is an optional module needed only when the state information of the RUI server 7 is generated when a user of the RUI client 4 uses a web page corresponding to an RUI provided by the RUI server 7. More specifically, when receiving from the RUI client 4 a request for the state information of the RUI server 7, generated when the user of the RUI client 4 uses a web page provided from the RUI server 7, the state manager 75 provides the state information of the RUI server 7 to the RUI client 4. That is, upon receiving the GETSTATES request message illustrated in FIG. 11 via the web server module 73, the state manager 75 transmits a GETSTATES response message illustrated in FIG. 12 in response to the GETSTATES request message.

Also, when receiving the state information of the RUI server 7 from the RUI client 4, the state manager 75 restores the state of the RUI server 7 based on the received information. That is, when receiving "ServerStatesString" in a restoring request message illustrated in FIG. 16 from the RUI client 4, the state manager 75 restores the state of the RUI server 7 based on the "ServerStatesString".

The RUI application module 74 performs an application for a web page corresponding to an RUI remote user interface. More specifically, when receiving a request for a web page from the RUI client 4 via the web server module 73, the RUI application module 74 creates a savable page providing a unit, e.g., a "SAVE" button, via which the user can instruct that the state information of the web page be saved, and provides the savable page to the RUI client 4.

Also, when receiving from the RUI client 4 a request to restore a web page selected by the user, the RUI application module 74 creates a savable page containing a Java script allowing the RUI client 4 to acquire the state information of the RUI client 4, by using the URL which is the location information of the site storing the state information of the RUI client 4, and provides the savable page to the RUI client 4.

The SS server selector 76 is an optional module needed only when the RUI CP module 71 is present. The SS server selector 76 creates a representation page displaying the information about the SS server 10 obtained by the RUI CP module 71 to a user, and provides the information to the RUI client 4. Also, as described above, when the user who recognizes the representation page selects the SS server 10, the SS server selector 76 provides a call window (not shown) with the information about the SS server 10 by using an opener object of the Java script.

FIGS. 8A and 8B illustrate syntax representing a savable page according to an exemplary embodiment of the present invention. Referring to FIGS. 8A and 8B, the savable page is a HyperText Markup Language (HTML) document. As illustrated in FIGS. 8A and 8B, the savable page provides a "SAVE" button to a user, and the Java script in the savable page, which is returned from the RUI server 7 through an on-click event callback for the "SAVE" button, is executed to perform a GETSTATES command and a SAVE command by using XMLHttpRequest or a TCP connection object. In order to perform the GETSTATES command and the SAVE command based on a HTTP by using the TCP connection object, a request for HTTP is directly constructed as shown in a HTTP a getserverstate( ) function or a save( ) function, which are illustrated in FIGS. 8A and 8B, and the request for HTTP is transmitted by sendData( ). When an XMLHttpRequest is used without the TCP connection object, the request for HTTP may be processed by using "open( ), onreadystatechange property, responseText property, send method( )". After opening a blank window in "startSelectingSSS( )" shown in FIGS. 8A and 8B, hyperlinks are created based on URLs and the names, and the href properties of each hyperlink are connected to an opener.save(url) callback.

More specifically, the web browser module 43 transmits a GETSTATES request message by using the HTTP object 432 and "getserverstate( )" so as to request the state information of the RUI server 7. That is, the web browser module 43 requests the state information of the RUI server 7 by opening a new socket, i.e., not a socket that is being used by a web page corresponding to an RUI, and transmitting the GETSTATES request message via the new socket.

Also, the web browser module 43 receives a GETSTATES response message by using the HTTP object 432 and "setserverstate( )", and obtains the state information of the RUI server 7 from the GETSTATES response message. That is, the web browser module 43 receives the GETSTATES response message via the new socket, and obtains the state information of the RUI server 7.

In particular, the web browser module 43 transmits a SAVE request message by using the HTTP object 432 and "save (url)" to request the SS server 10 to save the state information of the web page. That is, the web browser module 43 requests the SS server 10 to save the state information of the web page by opening a new socket, i.e., not the socket that is being used by a web page corresponding to an RUI and transmitting the SAVE request message via the new socket.

In particular, the web browser module 43 obtains the state information of the RUI client 4 from the SS server 10 by using HTTP object 432 and "checkSaveResult( )". That is, the web browser module 43 opens a new socket, i.e., not the socket that is being used by the web page corresponding to the RUI, requests the SS server 10 to provide the state information of the RUI client 4 via the new socket, and obtains the state information of the RUI client 4 in response to the request from the SS server 10 via the new socket.

If the RUI client 4 does not include the RUI CP module 41 and the SS handler 431, and the RUI server 7 includes the RUI CP module 71 and the SS server selector 76, the RUI server 7 provides a savable page represented by the syntax shown in FIGS. 9A and 9B, for example, which is different from the savable page represented by the syntax shown in FIGS. 8A and 8B.

FIGS. 9A and 9B illustrate syntax representing another exemplary embodiment of the savable page represented by the syntax shown in FIGS. 8A and 8B according to the present invention. The savable page represented by the syntax shown in FIGS. 9A and 9B is in the form of a HTML document when the RUI server 7 includes the RUI CP module 71 and the SS server selector 76. When a "SAVE" button in the savable page is clicked, Java scripts "getserverstate( )", "setserverstate( )", and "startSelectingSSS( )" in a savable page are sequentially executed, and "startSelectingSSS( )" executes "window.open( )". Thus, the SS server selector 76 provides a list of SS servers in the form of hyperlinks, and an on-click event handler for each of the hyperlinks corresponding to the SS servers is set to "opener.save(url)". As a result, a "save( )" function is called to execute a "SAVE" command.

Figure 10:
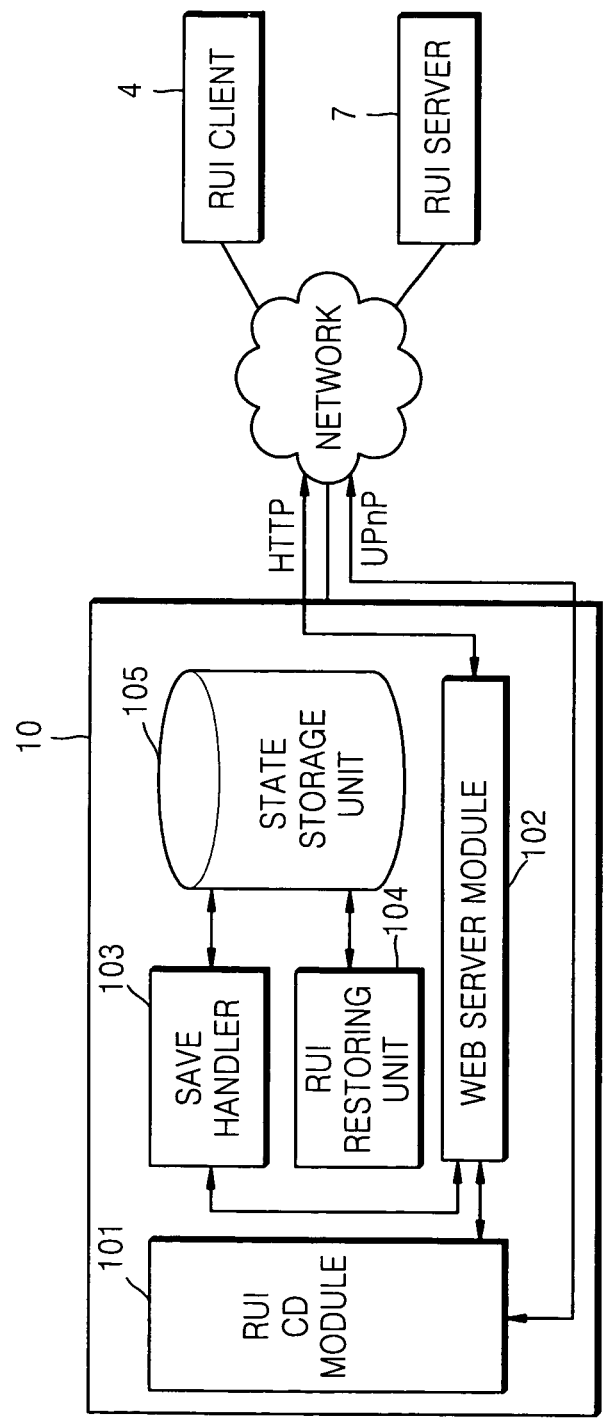
FIG. 10 is a block diagram of an SS server according to an exemplary embodiment of the present invention.

FIG. 10 is a block diagram of the SS server 10 according to an exemplary embodiment of the present invention. Referring to FIG. 10, the SS server 10 includes an RUI CD module 101, a web server module 102, a save handler 103, an RUI restoring unit 104, and a state storage unit 105.

The RUI CD module 101 advertises that it is a UPnP CD, and acts as a UPnP CD controlled by either the UPnP CP module 41 of the RUI client 4 or the UPnP CP module 71 of the RUI server 7, which discovers the RUI CD module 101 according to the advertisement. That is, the RUI CD module 101 may include information, such as <hasStatesStorage>true</hasStatesStorage>, in a description of the RUI CD module 101 in order to advertise that the SS server 10 has the state storage unit 105 capable of storing state information of a remote interface, i.e., a web page.

The web server module 102 acts as a HTTP-based general web server. That is, the web server module 102 is a HTTP server module that receives a request for an application from the RUI client 4, and processes the application and provides the processing result in response to the request. In particular, the web server module 102 receives and processes commands to save and restore the state information of a web page, which is received from the RUI client 4.

Figure 13:
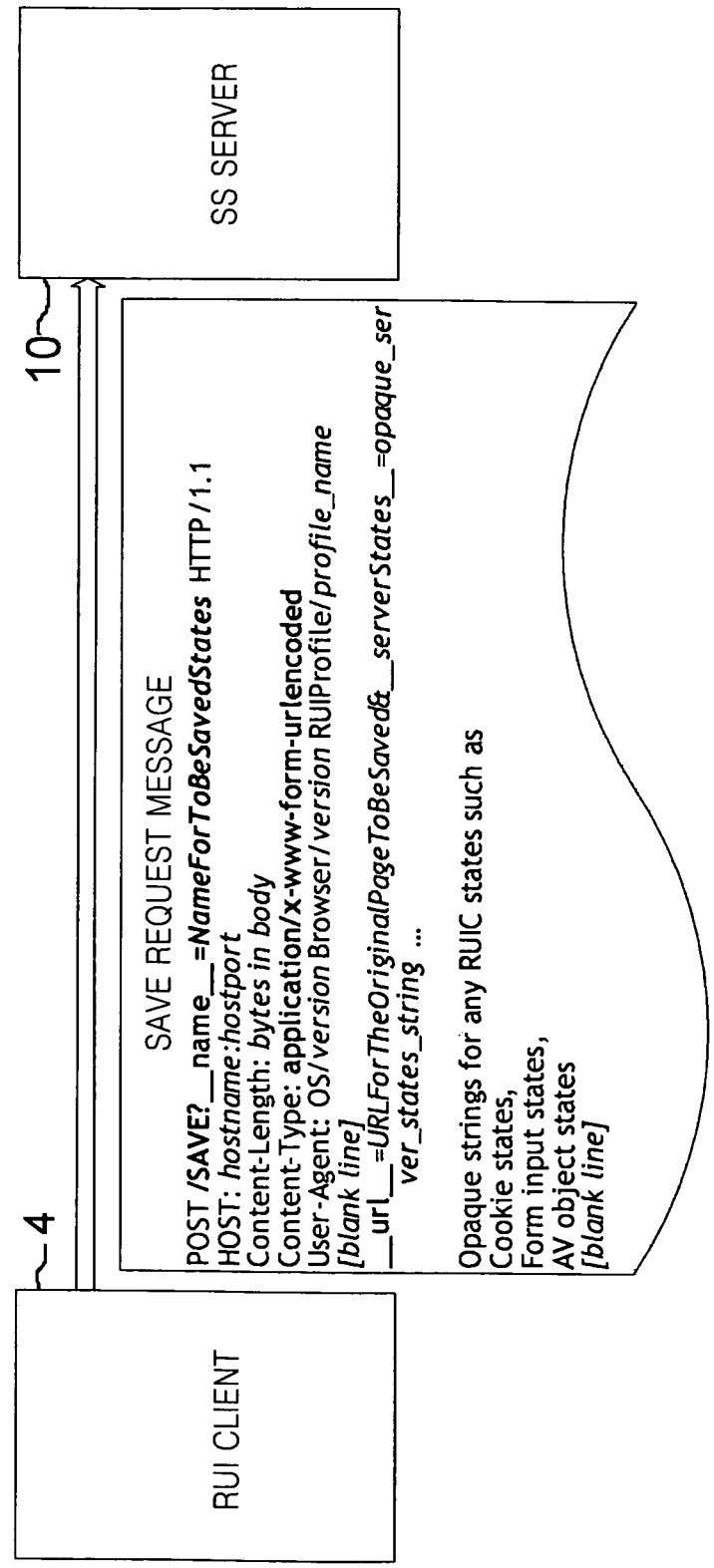
FIG. 13 illustrates the format of a SAVE request message according to an exemplary embodiment of the present invention.

When receiving a SAVE request message illustrated in FIG. 13 via the web server module 102, the save handler 103 stores all state information of the web page, which is contained in the SAVE request message, i.e., the state of the RUI client 4 and the state information of the RUI server 7, in the state storage unit 105.

Figure 18:
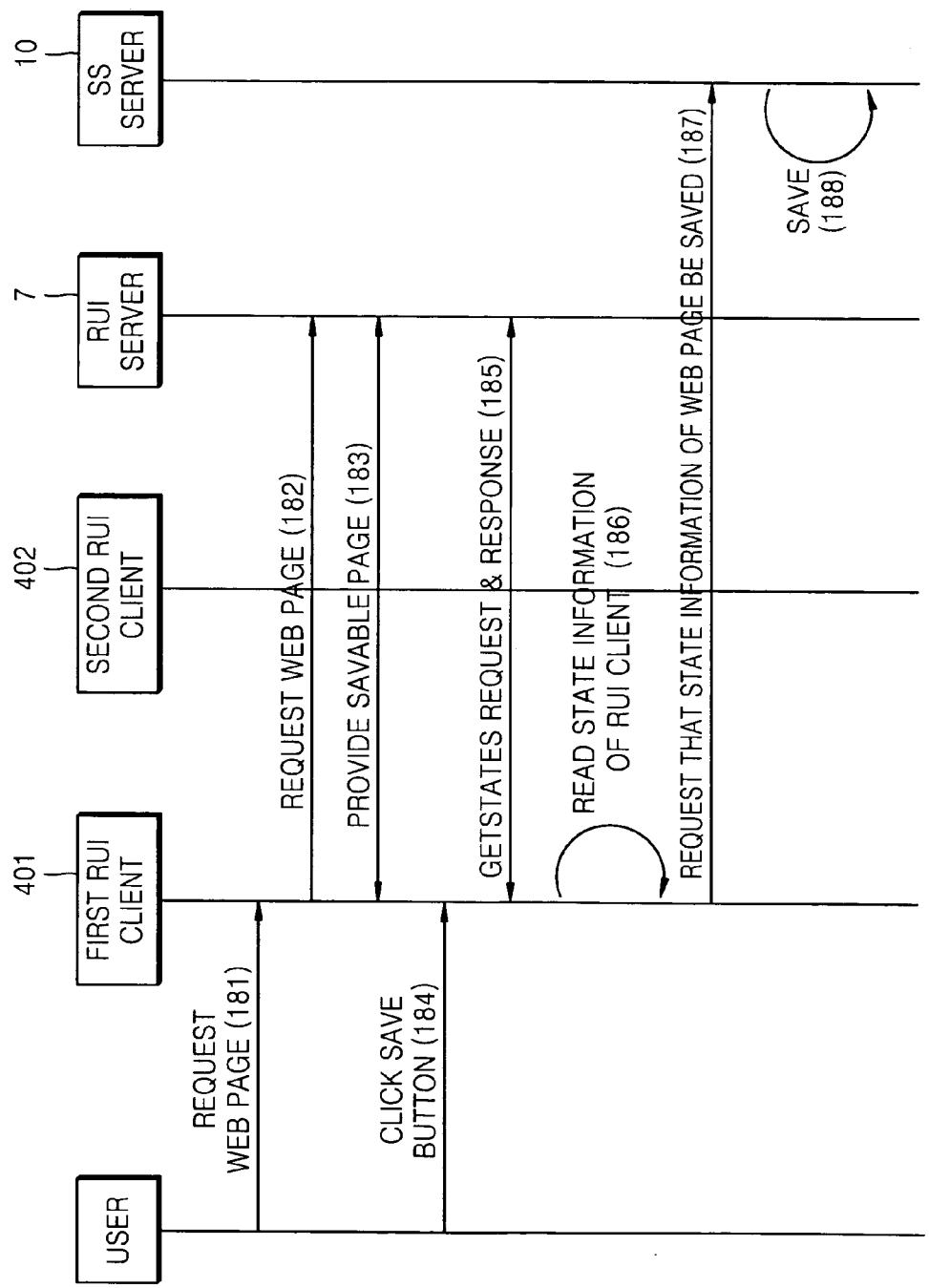
FIG. 18 is a timing diagram of a method of storing state information of an RUI according to an exemplary embodiment of the present invention.

The RUI restoring unit 104 allows the RUI client 4 to select and restore state information of the web page desired by a user. More specifically, when receiving a request for a list of restoring pages from the RUI client 4, the RUI restoring unit 104 provides the URLs of restoring pages stored in the state storage unit 105 (web pages corresponding to RUIs), the state information of the RUI server 7, and the URL which is location information of a site storing the state information of a first RUI client 401, as illustrated in FIG. 18. That is, when receiving the restoring page request message illustrated in FIG. 14 from the RUI client 4 via the web server module 102, the RUI restoring unit 104 transmits a restoring page response message illustrated in FIG. 15 in response to the message. Also, if the user selects one of the restoring pages, upon receiving a request for the selected restoring page, the RUI restoring unit 104 creates a savable page containing a Java script enabling the state information of the RUI client 4 to be obtained by using the URL which is the location information of the site storing the state information of the RUI client 4, and returns the savable page to a second RUI client 402 as illustrated in FIG. 18. That is, when receiving a restoring request page illustrated in FIG. 16 via the web server module 102, the UI restoring unit 104 transmits a savable page represented by the syntax shown in FIG. 17 to the RUI client 4 in response to the received page.

Also, when receiving a request for the state information of the RUI client 4, which is needed to restore the savable page provided to the RUI client 4, the RUI restoring unit 104 reads the state information of the RUI client 4 from the state storage unit 105 and provides it to the RUI client 4.

The state storage unit 105 stores all the state information of the web page which is received from the RUI client 4, e.g., the state information of the RUI client 4 and the state information of the RUI server 7, such as information regarding cookies generated when the user used RUIs, information regarding forms, AV object information.

Figure 11:
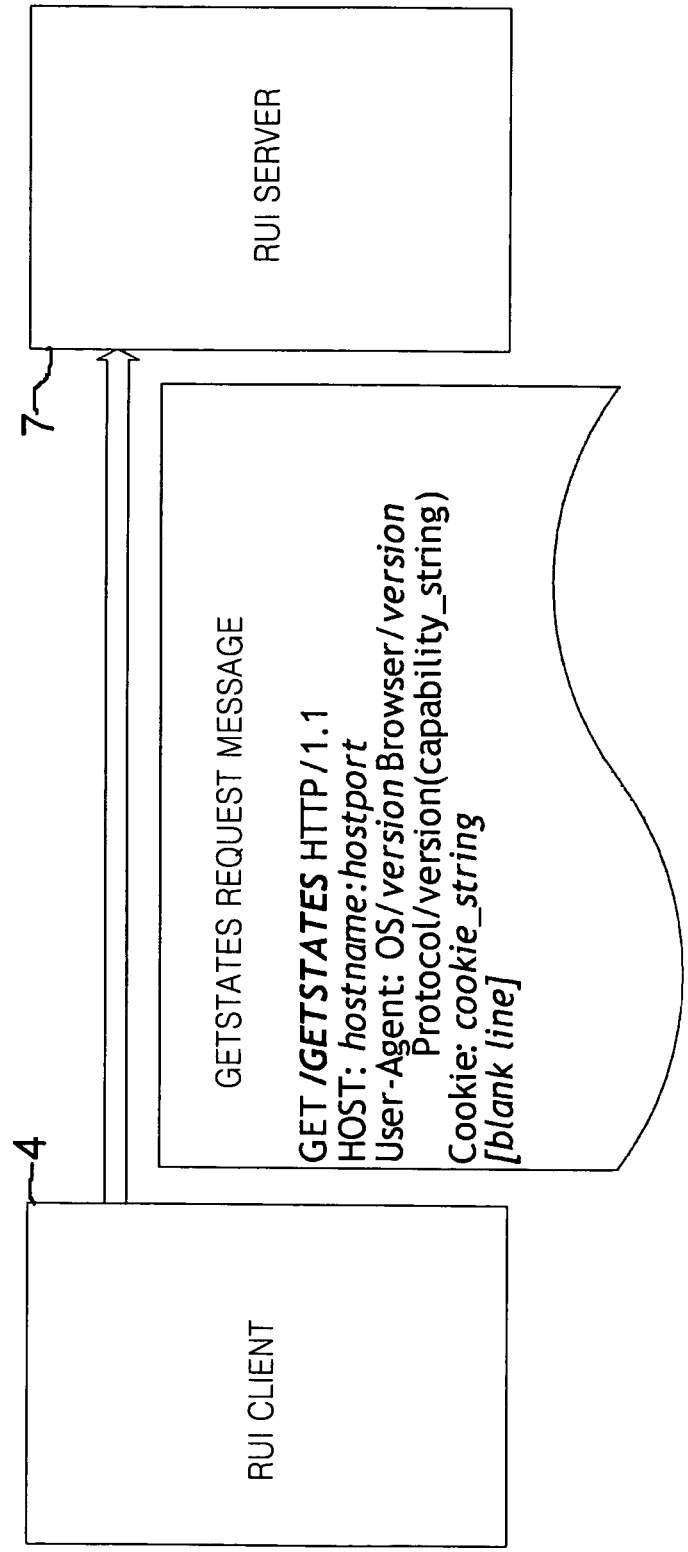
FIG. 11 illustrates the format of a GETSTATES request message according to an exemplary embodiment of the present invention.

FIG. 11 illustrates the format of a GETSTATES request message according to an exemplary embodiment of the present invention. The GETSTATES request message of FIG. 11 is a type of HTTP GET request message. Referring to FIG. 11, in order to request the state information of the RUI server 7, the name "GETSTATES" that is the URL of the state information of the RUI server 7 is input in a GET request line. However, it would be apparent to those of ordinary skill in the art that a name other than "GETSTATES" may also be used. Also, a user agent header contains "Protocol/version(capability_string)" indicating that the RUI client 4 can support a HTTP-based remote user interface, and may contain ">hasControlPoint>ture;>/hasControlPoint>" indicating that the RUI client 4 includes the RUI CP module 41 although it is not shown in FIG. 11. In particular, ">hasControlPoint>ture>/hasControlPoint>" is a string allowing an XML fragment, such as "<hasControlPoint>ture</hasControlPoint>", to be escaped from a URL.

Figure 12:
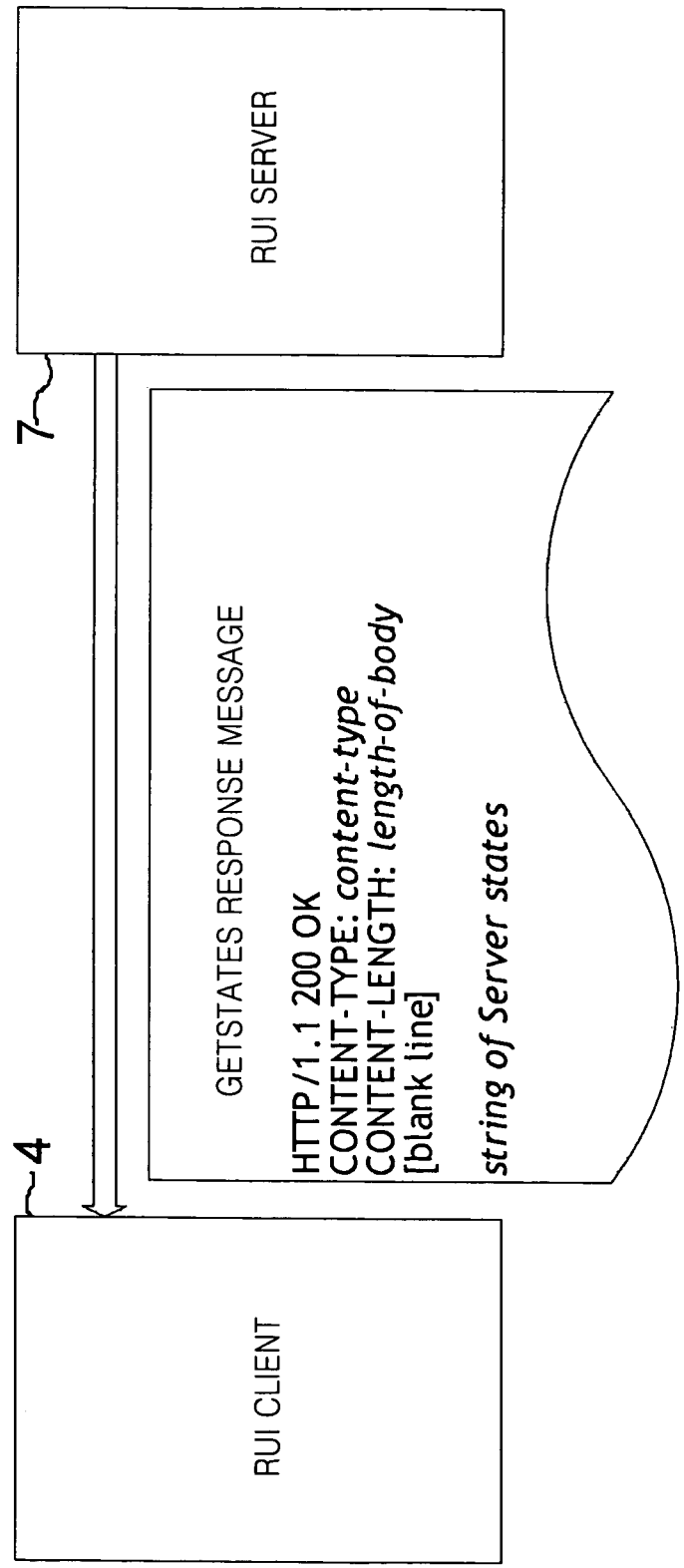
FIG. 12 illustrates the format of a GETSTATES response message according to an exemplary embodiment of the present invention.

FIG. 12 illustrates the format of a GETSTATES response message according to an exemplary embodiment of the present invention. The GETSTATES response message of FIG. 12 is a type of HTTP GET response message. Referring to FIG. 12, a content type field in the GETSTATES response message records the content type value of the state information of the RUI server 7. The content type value may be text/plain or application/x-www-url-encoded. Also, a field containing a string of server states in the GETSTATES response message records a state information value of the RUI server 7. Here, the state information value of the RUI server 7 must be determined in order to be interpreted by a Java script in a web page, which is provided by the RUI application module 74 of the RUIS server 7.

FIG. 13 illustrates the format of a SAVE request message according to an exemplary embodiment of the present invention. The SAVE request message of FIG. 13 is a type of HTTP GET request message. Referring to FIG. 13, "/SAVE" of a "POST /SAVE?_name_=NameForToBeSaved States" field is a command to save the state information of an RUI, which is generated by the RUI application module 74.

A "?_name_=NameForToBeSavedStates" of the "POST /SAVE?_name_NameForToBeSavedStates" field indicates the name of a web page to be stored in the SS server 10 and must be set to have a unique value. For example, the unique name may be "<title>tag+saved time". If a web page having the same name as the indicated name has already been stored in the state storage unit 105 of the SS server 10 receiving this message, the indicated name is renamed and stored.

A "Content-Type: application/x-www-form-urlencoded" field represents a multipurpose Internet mail extensions (MIME) type of body content of the SAVE request message, the format of which should be fixed so that the SS server 10 can understand it. Also, a "_url_=URLForTheOriginalPageToBeSaved&_server States_=opaque_server _states_string . . . " field, which is a part of the body of the SAVE request message, indicates the URL of a web page generated by the RUI application module 74 of the RUI server 7, and the state information of the RUI server 7. In particular, the value of "_serverStates_" is interpreted by the SS server 10 and thus may be set as the RUI server 7 desires. However, keys of the "_url_=URLForTheOriginalPageToBeSaved&_server States_=opaque_server _states_string . . . " field, i.e., "_url_" and "_serverStates_", must be predetermined between the RUI server 7 and the SS server 10 so that the SS server 10 can understand the keys.

An "Opaque strings for any RUIC states" field represents the state information of RUI client 4, e.g., cookie information, form input information, AV object state information. Since these strings are also the state information of the RUI client 4, key values of these strings need not be set to be understood by the SS server 10, unlike "_url_" and "_serverStates_". That is, the key values of these strings may be set such that only the RUI server 7 can understand them.

Figure 14:
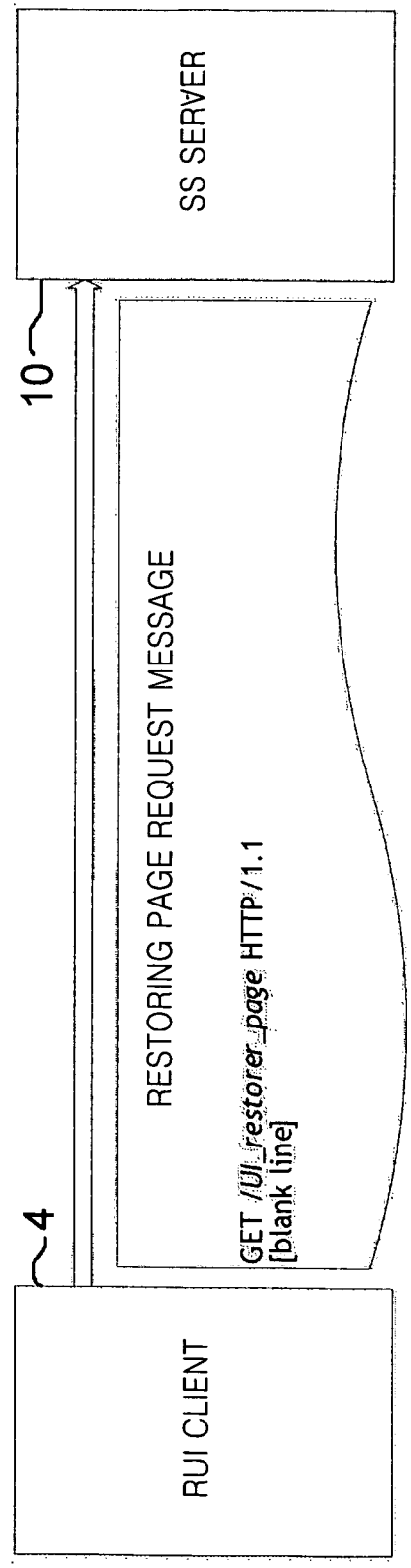
FIG. 14 illustrates the format of a restoring page request message according to an exemplary embodiment of the present invention.

FIG. 14 illustrates the format of a restoring page request message according to an exemplary embodiment of the present invention. The restoring page request message of FIG. 14 is a type of HTTP GET request message. A "/UI_restore_page" field representing a list of restoring pages may be provided in the form of an XML-based list included in the description of the SS server 10. For example, the XML-based list may be described in the form of "A_ARG_TYPE_CompatibleUIs" that is a return value of "GetCompatible Action( )" of the RUI server 7. In this case, one of the restoring pages may be recognized from an "<uri>" element following a protocol element of each state information element of "A_ARG_TYPE_CompatibleUIs".

Figure 15:
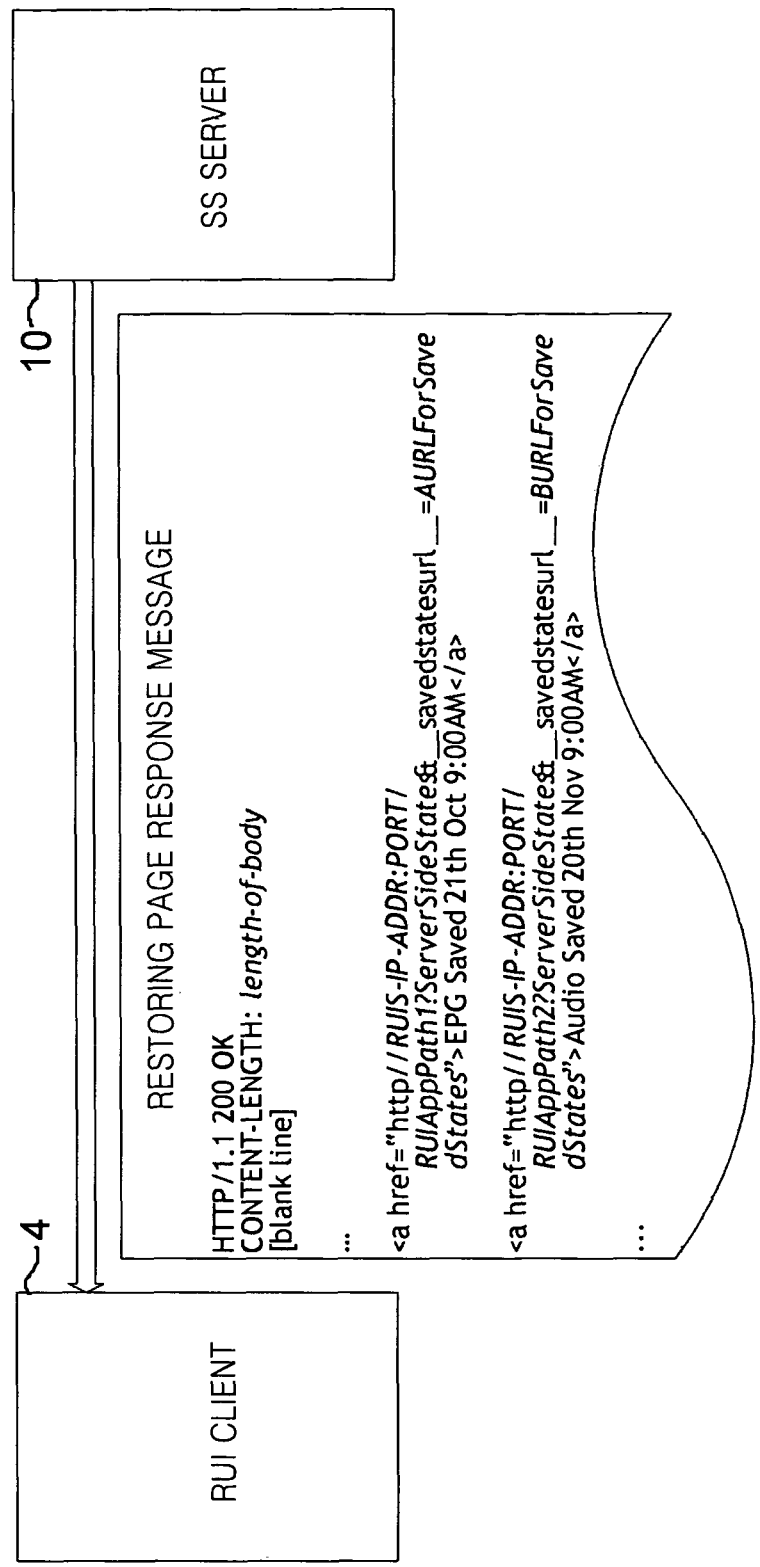
FIG. 15 illustrates the format of a restoring page response message according to an exemplary embodiment of the present invention.

FIG. 15 illustrates the format of a restoring page response message according to an exemplary embodiment of the present invention. The restoring page response message of FIG. 15 is a type of HTTP GET response message. Referring to FIG. 15, a document listing hyperlinks of restoring URLs is returned in response to the restoring page response message. Each of the restoring URLs has the following elements. "http://RUIS-IP-ADDR:PORT/RUIAppPath" indicates the path of an RUI application, i.e., the URL of the original RUI application page of the RUI server 7. "ServerSideStates" represents the URL of the state information of a server side of the original RUI server when an RUI has been stored. "_savedstatesurl_=AURLForSavedStates" represents the URL of location information of the state information of an RUI of RUI client 4, which is stored in the SS server 10.

When a user selects one of the hyperlinks, the RUI server 7 requests an application selected by the original RUI server. In this case, as described above, the state information of the RUI of the RUI server 7 and the location information of the state information of the RUI of the RUI client 4, which is stored in the SS server 7, are transmitted together.

FIG. 16 illustrates the format of a restoring request message according to an exemplary embodiment of the present invention. The restoring request message of FIG. 16 is a type of HTTP GET request message. Referring to FIG. 16, the value of "/RUIAppPath" of a GET request line must be the same as a path component of "_url_key" in the SAVE command shown in FIG. 8A. "ServerStatesString" is optional and must have the same value as "_serverStates_key" in the SAVE command. "_savedstatesurl_" indicates the URL which is the location information of the state information of the RUI of the RUI client 4, which is stored in the SS server 10.

FIG. 17 illustrates syntax of a savable page corresponding to a restoring response document according to an exemplary embodiment of the present invention. The savable page represented by the syntax shown in FIG. 17 is obtained by reading the stage information of an RUI from the SS server 10, and adding a Java script restoring the state of the RUI into the original savable page represented by the syntax shown in FIGS. 8A and 8B.

More specifically, the web browser module 43 acquires the state information of the first RUI client 401 from the SS server 10 by using the HTTP object 432, "startRestoringUIStates (URLForSavedStates)", and "restoreUIStates( )". That is, the web browser module 43 opens a new socket, not a socket being used by a web page corresponding to the RUI, and requests the SS server 10 to provide the state information of the first RUI client 401 via the new socket. Next, the web browser module 43 receives a response to the request via the new socket, and obtains the state information of the first RUI client 401 from the SS server 10 by using the received response.

A TCP connection object may be used to read the state information of an RUI from the SS server 10. FIG. 14 illustrates a scheme of reading the state information of an RUI from the SS server 10 via the interface of the TCP connection object illustrated in FIG. 6. Otherwise, it is possible to read the state information of the RUI from the SS server 10 by using the XMLHttpRequest, such as "open( )", "send( )", "onreadystatuschange", and "responseText", and then restore the RUI.

FIG. 18 is a timing diagram of a method of storing the state information of an RUI according to an exemplary embodiment of the present invention. The method of FIG. 18 is comprised of timing operations performed by the RUI client 4 illustrated in FIG. 4, the RUI server 7 illustrated in FIG. 7, and the SS server 10 illustrated in FIG. 10. Therefore, although not described here, the above operations of the RUI client 4 illustrated in FIG. 4, the RUI server 7 illustrated in FIG. 7, and the SS server 10 illustrated in FIG. 10 are also applicable to the method illustrated in FIG. 18.

However, since a method of storing an RUI according to an exemplary embodiment of the present invention is applied to two RUI clients, the RUI client 4 illustrated in FIG. 4 will be divided into the first RUI client 401 and the second RUI client 402 for convenience. The first RUI client 401 and the second RUI client 402 are generally separate RUI clients, but they may be regarded as a single RUI client. For example, in the former case, a user uses a web page in a plurality of RUI clients, and in the latter case, the user sequentially uses a first web page, a second web page, and the first web page in only a single RUI client.

In operation 181, the first RUI client 401 receives a request for a web page corresponding to an RUI from a user.

In operation 182, the first RUI client 401 requests the RUI server 7 to provide the web page requested in operation 181.

In operation 183, the RUI server 7 provides the first RUI client 401 with the web page requested in operation 182. Here, the web page provided by the RUI server 7 is a savable page containing a unit, i.e., a SAVE button, whereby the user can save the state information of the web page.

In operation 184, the first RUI client 401 receives a command to save the state information of the web page, when the user clicks the save button.

In operation 185, the first RUI client 401 transmits a GETSTATES request message to the RUI server 7 in order to request the RUI server 7 to provide the state information. Next, the RUI server 7 receives the GETSTATES request message, and transmits a GETSTATES response message in response to the GETSTATES request message. Next, the first RUI client 401 receives the GETSTATES response message, and obtains the state information of the RUI server 7 contained in the GETSTATES response message. Ok? Operation 185 is optional and is needed when the RUI server 7 manages the state information of RUI.

In particular, in operation 185, the first RUI client 401 requests the state information of the RUI server 7 by transmitting the GETSTATES request message by using HTTP object 432. Also, in operation 185, the first RUI client 401 receives the GETSTATES response message by using HTTP object 432, and obtains the state information of the RUI server 7 from the GETSTATES response message.

That is, in operation 185, the first RUI client 401 opens a new socket, i.e., not a socket being used by the RUI, and transmits the GETSTATES request message via the new socket in order to request the state information of the RUI server 7. Also, in operation 185, the first RUI client 401 receives the GETSTATES response message via the new socket, and obtains the state information of the RUI server 7 from the GETSTATES response message.

In operation 186, the first RUI client 401 reads from the web page the state information of the first RUI client 404, which is generated when the user uses the web page.

In operation 187, the first RUI client 401 transmits a SAVE request message to the SS server 10 to request the SS server 10 to save the state information of the web page. In particular, in operation 187, the first RUI client 401 requests the SS server 10 to save the state information of the web page by transmitting the SAVE request message using the HTTP object 432.

That is, in operation 187, the first RUI client 401 opens a new socket, i.e., not the socket being used by the web page corresponding to the RUI, and transmits the SAVE request message via the new socket in order to request the SS server 10 to save the state information of the web page.

In operation 188, the SS server 10 receives the SAVE request message, and stores the state information of the web page, which is included in the SAVE request message, in the state storage unit 105.

Figure 19:
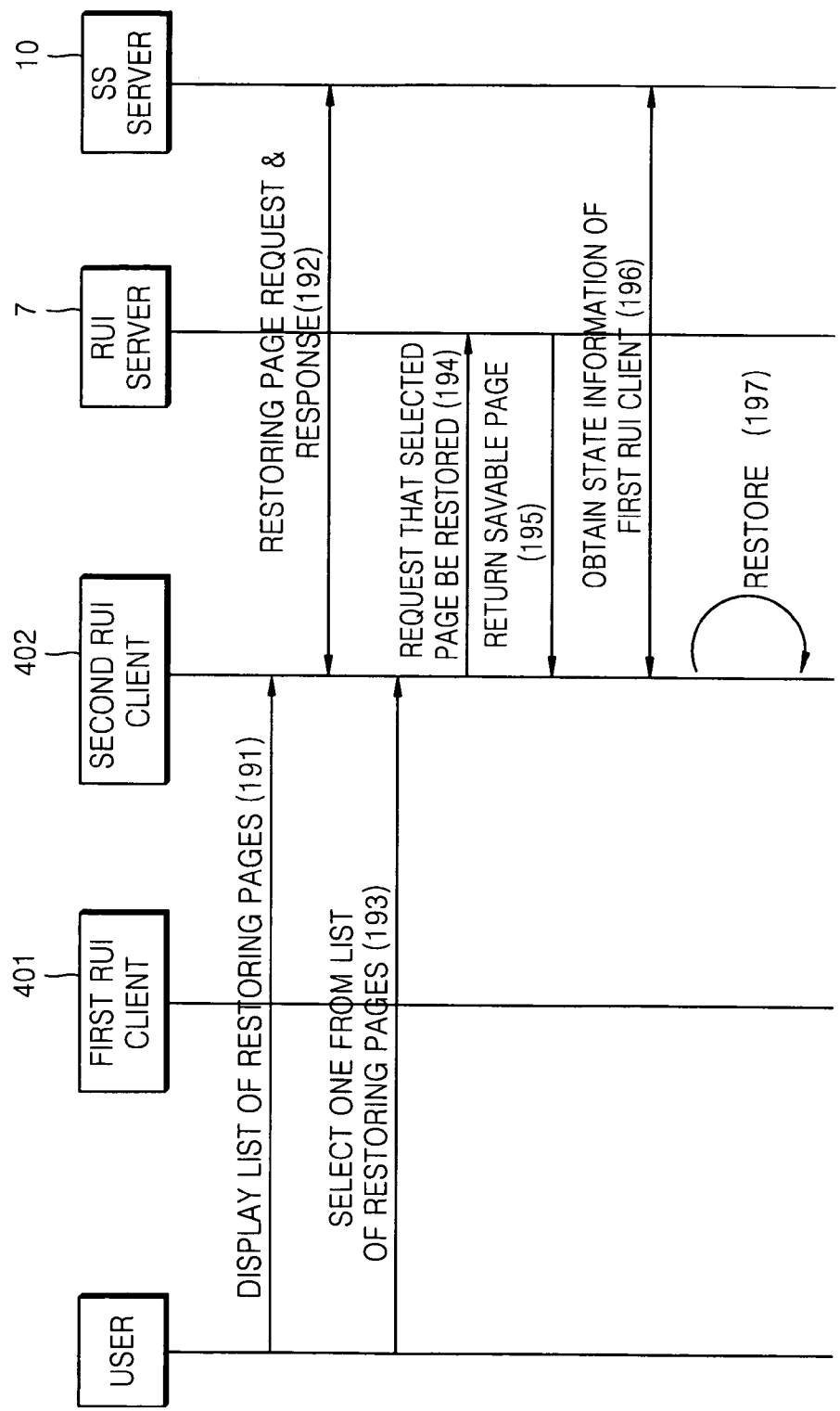
FIG. 19 is a timing diagram of a method of restoring state information of an RUI according to an exemplary embodiment of the present invention.

FIG. 19 is a timing diagram of a method of restoring the state information of an RUI according to an exemplary embodiment of the present invention. The method of FIG. 19 is comprised of timing operations performed by the RUI client 4 illustrated in FIG. 4, the RUI server 7 illustrated in FIG. 7, and the SS server 10 illustrated in FIG. 10. Therefore, although not described here, the above operations of the RUI client 4 illustrated in FIG. 4, the RUI server 7 illustrated in FIG. 7, and the SS server 10 illustrated in FIG. 10 are also applicable to the method illustrated in FIG. 18. In particular, the method illustrated in FIG. 19 is performed after all the operations of the method illustrated in FIG. 18 are completed.

In operation 191, the second RUI client 402 receives from a user a command to display a list of restoring pages.

In operation 192, the second RUI client 402 transmits a restoring page request message to the SS server 10 in order to request the list of restoring pages. Next, the SS server 10 receives the restoring page request message, and transmits a restoring page response message in response to the restoring page request message. Next, the second RUI client 402 receives the restoring page response message, and obtains from the received message the list of restoring pages, i.e., the URLs of web pages corresponding to RUIs, the state information of the RUI server 7, and the URL which is the location information of a site storing the state information of the first RUI client 401. Next, the second RUI client 402 displays the list of restoring pages to the user.

In operation 193, the second RUI client 142 receives the user's input indicating that one of the restoring pages from the list of restoring pages has been selected by the user. That is, the second RUI client 142 is informed of the URL of a web page that the user desires to restore.

In operation 194, the second RUI client 402 requests the RUI server 7 to restore the selected web page. That is, the second RUI client 402 provides the RUI server 7 with the state information of the RUI server 7, and the URL which is the location information of the site storing the state information of the first RUI client 401 in order to request the RUI server 7 to start execution of an application for the RUI.

In operation 195, the RUI server 7 restores the state of the RUI 7 in the web page by using the state information of the RUI server 7 provided in operation 194. Next, the RUI server 7 creates a savable page containing a Java script allowing the state information of the first RUI client 401 to be obtained, by using the URL which is the location information of the site storing the state information of the first RUI client 401, which is provided by the second RUI client 402 in operation 194, and returns the savable page to the second RUI client 402.

In operation 196, the second RUI client 402 executes the Java script in the savable page returned in operation 195 so as to obtain the state information of the first RUI client 401, which is needed to restore the selected web page, from the SS server 10 by using the URL which is the location information of the site storing the state information of the first RUI client 401. In particular, in operation 196, the second RUI client 402 obtains the state information of the first RUI client 401 from the SS server 10 by using the HTTP object 432.

That is, in operation 196, the second RUI client 402 opens a new socket, i.e., not a socket being used by a web page corresponding to an RUI, and requests the SS server 10 to provide the state information of the first RUI client 401 via the new socket. Next, in operation 196, the second RUI client 402 receives a response to the request via the new socket, and obtains the state information of the first RUI client 401 contained in the response from the SS server 10.

In operation 197, the second RUI client 402 executes the Java script in the savable page returned from the RUI server 7 in order to reflect the state information of the first RUI client 401, which is obtained in operation 196, in the savable page, thereby restoring the state of the first client 401 in the web page.

Figure 20:
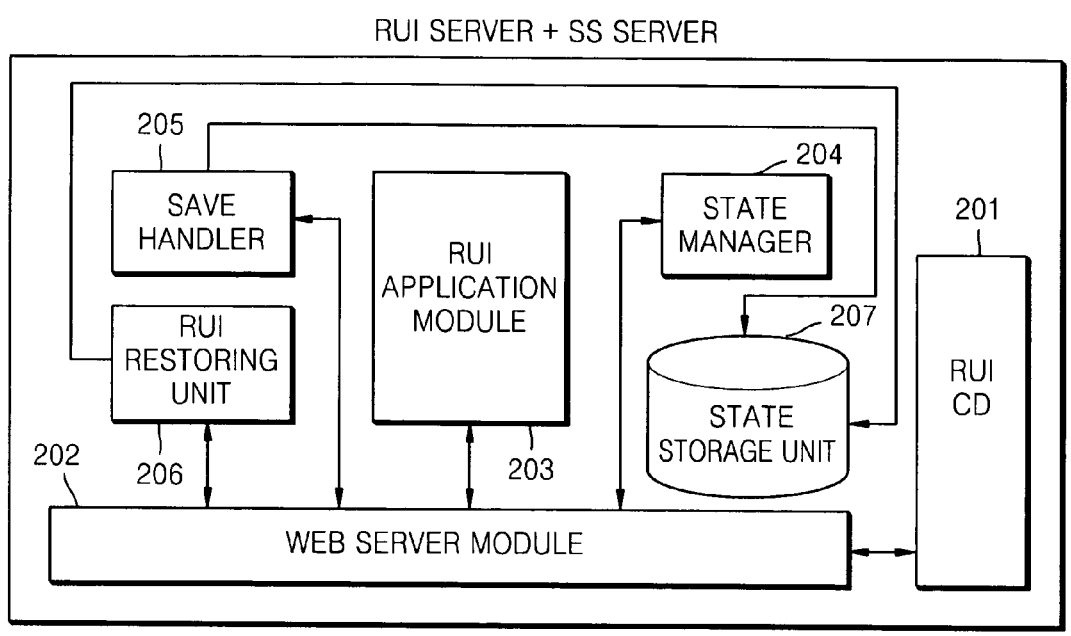
FIG. 20 is a timing diagram of an apparatus that is a combination of the RUI server of FIG. 7 and the SS server of FIG. 10 according to an exemplary embodiment of the present invention.

FIG. 20 is a block diagram of an apparatus that is a combination of the RUI server 7 illustrated in FIG. 7 and the SS server 10 illustrated in FIG. 10 according to an exemplary embodiment of the present invention. The apparatus of FIG. 20 includes an RUI CD module 201, a web server module 202, an RUI application module 203, a state manager 204, a save handler 205, an RUI restoring unit 206, and a state storage unit 207. Since the functions of the RUI server 7 and the SS server 10 are combined in the apparatus of FIG. 20, a process of selecting an SS server is not needed, and thus, the SS server selector 76 of FIG. 7 is not included in the apparatus of FIG. 20. That is, it is possible to directly call a save( ) function by using the URL of the apparatus illustrated in FIG. 20 as an argument without calling "startSelectingSSS( )" in the "setserverstate( )" field of the savable page represented by the syntax shown in FIGS. 8A and 8B or FIGS. 9A and 9B.

It would be apparent to those of ordinary skill in the art that the present invention is not limited to the construction of the apparatus of FIG. 20, that is, it is possible to design the apparatus in various ways based on the above described exemplary embodiments of the present invention.

The above exemplary embodiments of the present invention can be embodied as a program that can be executed by a computer system, and executed by a general digital computer via a computer readable medium. Also, data constructions used in the above exemplary embodiments can be recorded in a computer readable medium via various devices.

Examples of the computer readable medium include a magnetic recording medium (a ROM, a floppy disk, a hard disk, etc.), an optical recording medium (a CD-ROM, a DVD, etc.), or carrier waves (such as in transmission over the Internet).

According to the present invention, an RUI client requests an external storage server to store the state information of an RUI by using an HTTP object that processes an HTTP request without reloading a web page, and restores the original state of the RUI by using the stored state information. Accordingly, a method of storing and restoring the state information of an RUI according to UPnP according to the present invention, is applicable to a HTTP-based remote protocol model having stateless characteristics that do not allow the state information of an RUI to be saved.

In particular, as described above, use of the HTTP object that processes an HTTP request without reloading a web page removes the need for a complicated interaction procedure of reloading the web page, thereby restoring an RUI, which is based on a HTTP having stateless characteristics, with a very simple interaction procedure.

Further, according to the present invention, information regarding storage servers is displayed in order to allow a user to select a desired storage server to store the state information of an RUI. Also, according to the present invention, a list of restoring pages is displayed in order to allow the user to select a web page to be restored from the list of restoring pages, the state information of which is stored in a storage server.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of allowing a client, which receives a remote user interface from a server, to request state information of the remote user interface to be saved, the method comprising:

obtaining, by the client, state information of the remote user interface, which is generated when the remote user interface is used, by using an object which processes a predetermined request without reloading the remote user interface; and requesting, by the client, that the obtained state information be stored in a device that is distinct from the client and the server, by transmitting a message including the obtained state information to the device, wherein the client receives the remote user interface from the server and separately from any state information for the remote user interface previously stored in the device, wherein the remote user interface is a web page based on a stateless protocol which does not allow the state information to be stored, and wherein the requesting comprises transmitting the request to the device providing a storage for storing the state information.

2. The method of claim 1, wherein the object is a Java script object which processes the predetermined request without reloading the web page.

3. The method of claim 1, wherein the obtaining comprises opening a new socket, which is not a socket being used by the remote user interface, and obtaining the state information via the new socket.

4. The method of claim 1, wherein the requesting comprises opening a new socket, which is not a socket being used by the remote user interface, and requesting that the state information be stored via the new socket.

5. The method of claim 1, further comprising a user selecting the device to store the state information, wherein the requesting comprises transmitting the request to the device based on information regarding the selected device.

6. The method of claim 1, wherein the obtaining comprises:

obtaining state information of the server, which is generated when the remote user interface is used; and obtaining state information of the client, which is generated when the remote user interface is used.

7. The method of claim 6, when a command to store the state information of the server is received from the user, further comprising requesting the server to provide the state information thereof, wherein the obtaining the state information of the storage server comprises obtaining the state information of the server from a response to the request.

8. The method of claim 6, wherein the obtaining the state information of the client comprises reading the state information of the client from the remote user interface in order to obtain the state information of the client.

9. The method of claim 1, wherein the client is a universal plug and play controlled device.

10. The method of claim 1, wherein the client and the server are universal plug and play (UPnP) devices of a UPnP network.

11. The method of claim 1, further comprising:

receiving the remote user interface from the server, wherein the obtaining comprises, in response to a command to store the state information of the received remote user interface subsequent to the receiving the remote user interface, obtaining, from the server, state information of the server and obtaining state information of the client.

12. A non-transitory computer readable recording medium having recorded thereon a program for executing a method of allowing a client, which receives a remote user interface from a server, to request storage of state information of a remote user interface, the method comprising:

obtaining, by the client, state information of the remote user interface, which is generated when the remote user interface is used, by using an object which processes a predetermined request without reloading the remote user interface; and requesting, by the client, that the obtained state information be stored in a device that is distinct from the client and the server, by transmitting a message including the obtained state information to the device, wherein the client receives the remote user interface from the server and separately from any state information for the remote user interface previously stored in the device, wherein the remote user interface is a web page based on a stateless protocol which does not allow the state information to be stored, and wherein the requesting comprises transmitting the request to the device providing a storage for storing the state information.

13. An apparatus for allowing a client, which uses a remote user interface provided from a server, to request storage of state information of the remote user interface, the apparatus comprising:

a remote user interface control point module which obtains information regarding a storage server which provides storage for storing the state information; and a web browser module requesting the storage server to store the state information by using an object which processes a predetermined request without reloading the remote user interface, based on the information regarding the storage server obtained by the remote user interface control point module, wherein at least one of the remote user interface control point module and the web browser module is implemented as a hardware component, wherein the storage server is distinct from the server and the client which receives the remote user interface from the server, wherein the client receives the remote user interface from the server and separately from any state information for the emote user interface previously stored in the storage server, and wherein the remote user interface is a web page based on a stateless protocol which does not allow the state information to be stored.

14. The apparatus of claim 13, wherein the web browser module obtains state information, which is generated when the client uses the remote user interface, by using the object, and requests that the obtained state information be stored.

15. The apparatus of claim 13, wherein the remote user interface control point module obtains the information of the storage server during universal plug and play discovery.

16. A method of allowing a client, which receives a remote user interface from a server, to restore state information of the remote user interface, the method comprising:

obtaining, by the client, state information, which is generated when the remote user interface is used, by using an object which processes a predetermined request without reloading the remote user interface; and reflecting, by the client, the obtained state information in the remote user interface, wherein the obtaining the state information comprises obtaining, by the client, the state information from a device that is distinct from the client and the server, by receiving a message including the state information from the device, wherein the client receives the remote user interface from the server and separately from the state information for the remote user interface obtained from the device, and wherein the remote user interface is a web page based on a stateless protocol which does not allow the state information to be stored.

17. The method of claim 16, wherein the object is a Java script which processes the predetermined request without reloading the web page.

18. The method of claim 16, wherein the obtaining the state information comprises opening a new socket, which is not a socket being used by the remote user interface, and obtaining the state information via the new socket.

19. The method of claim 16, wherein the obtaining the state information comprises obtaining state information of the client, which is generated when the remote user interface is used, and the reflecting the obtained state information comprises reflecting the obtained state information of the client in the remote user interface.

20. The method of claim 16, wherein the obtaining the state information further comprises:

obtaining state information of the server, which is generated when the remote user interface is used; and providing the obtained state information of the server to the server.

21. The method of claim 16, further comprising displaying a list of web pages, which are restorable when a user selects them, to a user, and allowing the user who recognizes the displayed list of web pages to select one from the list of web pages, wherein the obtaining the state information comprises obtaining state information needed to restore the selected web page.

22. A non-transitory computer readable recording medium having recorded thereon a program for executing a method of allowing a client, which receives a remote user interface from a server, to restore state information of the remote user interface, the method comprising:

obtaining, by the client, state information, which is generated when the remote user interface is used, by using an object which processes a predetermined request without reloading the remote user interface; and reflecting, by the client, the obtained state information in the remote user interface, wherein the obtaining the state information comprises obtaining, by the client, the state information from a device that is distinct from the client and the server, by receiving a message including the state information from the device, wherein the client receives the remote user interface from the server and separately from the state information for the remote user interface received from the device, and wherein the remote user interface is a web page based on a stateless protocol which does not allow the state information to be stored.

23. An apparatus for allowing to a client, which receives a remote user interface from a server, to restore state information of the remote user interface, the apparatus comprising:

a remote user interface control point module which obtains information regarding a storage server providing storage for storing the state information; and a web browser module which obtains the state information from the storage server by using an object which processes a predetermined request without reloading the remote user interface, based on the information regarding the storage server obtained by the remote user interface control point module, and reflects the obtained state information in the remote user interface, wherein at least one of the remote user interface control point module and the web browser module is implemented as a hardware component, wherein the storage server is distinct from the server and the client which receives the remote user interface from the server, wherein the client receives the remote user interface from the server and separately from the state information for the remote user interface obtained from the storage server, and wherein the remote user interface is a web page based on a stateless protocol which does not allow the state information to be stored.

24. The apparatus of claim 23, wherein the web browser module requests the storage server to provide state information, which is generated when the client uses the remote user interface, by using the object; and obtaining the state information in response to the request.

25. The apparatus of claim 23, wherein the remote user interface control point module obtains the information of the storage server during universal plug and play discovery.

* * * * *